Fig. 1.

INVENTOR.
ANTHONY J. ZUERCHER

Fig. 3a.

INVENTOR.
ANTHONY J. ZUERCHER
BY
ATTORNEYS

INVENTOR.
ANTHONY J. ZUERCHER
BY
Kenyon & Kenyon
ATTORNEYS

United States Patent Office 3,136,430
Patented June 9, 1964

3,136,430
AUTOMATIC MATERIAL HANDLING SYSTEM
Anthony J. Zuercher, Easton, Pa., assignor to T. W. &
C. B. Sheridan Co., New York, N.Y., a corporation of
New York
Filed July 6, 1960, Ser. No. 41,189
12 Claims. (Cl. 214—11)

This invention relates to automatic handling systems and more particularly to an automated system for the routing and handling of bundles, boxes and the like from the time of preparation to their delivery to trucks or cars for transportation away from the processing plant. The particular embodiment described and illustrated herein relates to an automated mail room for a large newspaper.

The amount of manual labor required heretofore in the handling of newspapers from the time they come from the press until loaded into the delivery trucks has been responsible for a major item in the expense of publishing a newspaper. The handling of each bundle of papers, when thousands of bundles per hour are being produced, to see that it reaches the proper delivery truck at the proper time involves the combined labors of many men. Inasmuch as labor costs are a major factor, this individual treatment of each bundle means that the total cost of processing the bundles is reaching a prohibitive amount.

With this problem in mind the present invention has an object to provide an automatic system for the handling of packages or bundles.

A further object is to provide an automatic system for handling newspapers from the time of printing and combining the completed papers until the delivery of bundles into a delivery truck.

A still further object is to provide a system of separate modular components which may be interconnected by control means for the automatic handling of separate phases of the processing of packages and bundles.

Another object is to provide a handling system which may operate a programmed dispatch schedule entirely automatically, part automatically and part semi-automatically or semi-automatically alone, and any portion of which may be manually controlled.

A still further and general object is to provide an automatic system which eliminates much of, if not all of, the manual handling of packages or bundles and the like.

With these objects in mind, a brief description of the system of this invention will be given in order to point out some of the general features of this invention. It will be appreciated that, in the main, the entire system may be employed with any type of bundle or package handling situation either without modification or only such minor modfications as are dictated by the application of the system to a problem of handling a particular type of bundled or packaged material. As aforesaid the description below deals with the application of the system of this invention to a mailroom of large daily newspapers.

With the advant of modern high speed newspaper presses, the publication of several different editions of a single newspaper and delivery to areas distant from the newspaper, it can readily be appreciated that speed and accuracy in the handling of newspapers is essential. To a great extent most of the handling of the newspapers has been accomplished by manual labor by the so-called mail-room personnel. In particular it has been the function of the mail-room of a larger newspaper to bundle the papers, label both as to quantity per bundle and destination of the bundle, and to deliver the bundles to the proper delivery trucks for transportation to their ultimate destination. In general, the newspaper's circulation department makes up a schedule for each edition. This schedule is used by the mail-room personnel whose responsibility it is to see that those delivery trucks who service a particular number of outlets receive the proper bundles in the proper sequence so that loading of the trucks is in accordance with their delivery routes. A further complication lies in the fact that often trucks are required to deliver one edition and then return in time for use in the delivery of a subsequent edition. All of which makes for a complex scheduling problem.

The system of this invention is designed to eliminate the manual handling and control of bundles by the mail room personnel. The system is made up from a number of interconnected modular units each of which takes over a portion of the handling operation. The system in its entirety or a group of modular units is controlled by means of which is usually a control console.

The control console may be set up in accordance with the circulation schedule to program the delivery of bundles completely automatically or in varying degrees of semi-automatic operation. The control console is adapted to be programmed manually by an operator or may be actuated from punch cards, magnetic tape, or the like from the circulation schedule.

In fully programmed operation the control console is operated from a number of punch cards or a like system of intelligence prepared by the circulation department. The punch cards or the like are designed to govern the functions of the control console and cause it to operate automatically all portions of the feeding, dispatching and delivery systems without the need for an operator. In automatic operation, the control console operator programs the delivery and dispatch system so as to provide for servicing predetermined loading stations in a given sequence. In partially semi-automatic operation the sequence of the loading operation is wholly controlled by the control console operator and no pre-programming is required. In manual operation all portions of the system are controlled separately from the separate loading stations, or from the control console, but each function of delivery, counting and dispatching is or may be separately controlled.

In general all of the components in the dispatch portion of the system are under the control of the control console. The dispatch portion of the system operates to carry tied and, if required, labeled bundles to the particular delivery truck which is shceduled to receive bundles. The dispatch portion of the system is made up of conveyor means, flow deflector means and loading means. The conveyor means includes a number of separate conveyor tables, each of which may be bidirectional in operation. Feeder conveyors carry the output of the presses, stacker and counter means, wrapper applier means and bundle tying unit to the dispatch conveyor. The feeding of bundles onto the feeder conveyors and the dispatch conveyor is governed by stop means which operate automatically to insure that there will be an uninterrupted flow from the feeder conveyors and to dispatch conveyor from the bundle tying and feeder conveyors respectively.

Tridirectional, and when necessary bidirectional, deflectors are used to route the flow from the dispatch conveyor to delivery means, one of which is associated with each loading station. There is associated with each of the deflectors a counter which registers a count for each bundle passing from the dispatch conveyor to the delivery means. A delivery truck, in position at a given loading station, will receive a flow of bundles until the total number required for the particular route has passed the delivery means. The deflector means remains in position until the proper count has been registered at which time a signal from the control console will actuate the deflector extending means to withdraw the deflector.

Depending on the location of the next loading station scheduled to receive delivery and whether the delivery truck is in position, the control console will actuate the controls for the dispatch conveyor sections to control the flow on them in the same or reverse direction. Also the control console acts to cause the extension of the appropriate deflector means so that the flow is routed to the extended deflector means, which in turn diverts the flow to the delivery means for the next truck in position which is to be loaded.

The same sequence is continued until the entire circulation schedule is completed. The control console is so arranged so that the entire schedule may be pre-programmed, and hence the operation of the system is automatic. However, means are provided so that the control console operator may manually program the flow or may preprogram a portion only of the schedule for automatic handling.

The separate components that make up the system are modular, that is, they may be used in almost any combination so that any selected number of the individual handling operations may be automated. Also they are adapted to be interconnected in a manner making possible an installation of a part of the system, which can be supplemented as the need or desire for additional automation arises. Thus there is provided a compeltely flexible system, suitable for installation in any newspaper mail room which is completely or partially automatic in operation. Such a system is flexible, not only in operation, but also in the provision of sub-combinations of modular units or elements, making possible the automation of all or a part of the functions of a newspaper mail room.

Other objects and features of this invention will become more apparent in the description which follows when taken with the accompanying drawings in which.

Figure 1:
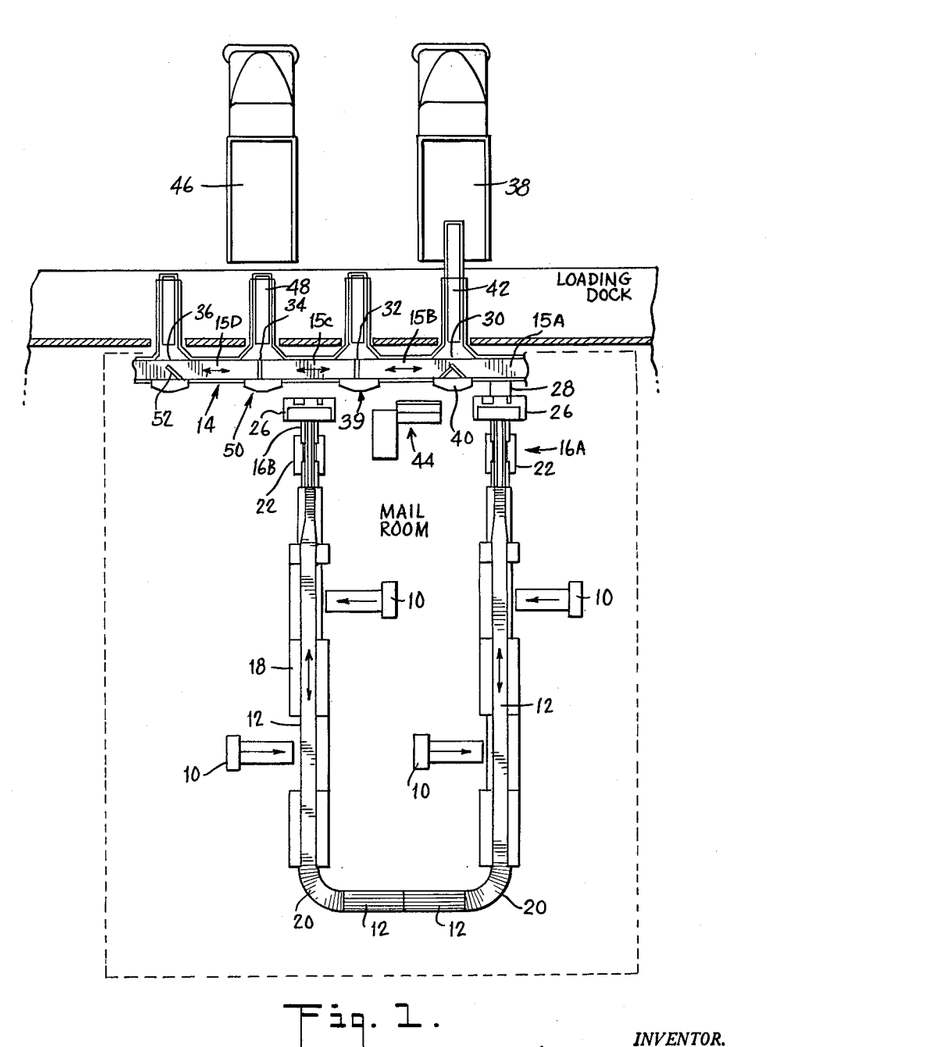
FIG. 1 is a schematic flow sheet illustrating the system of this invention.
Figure 2:
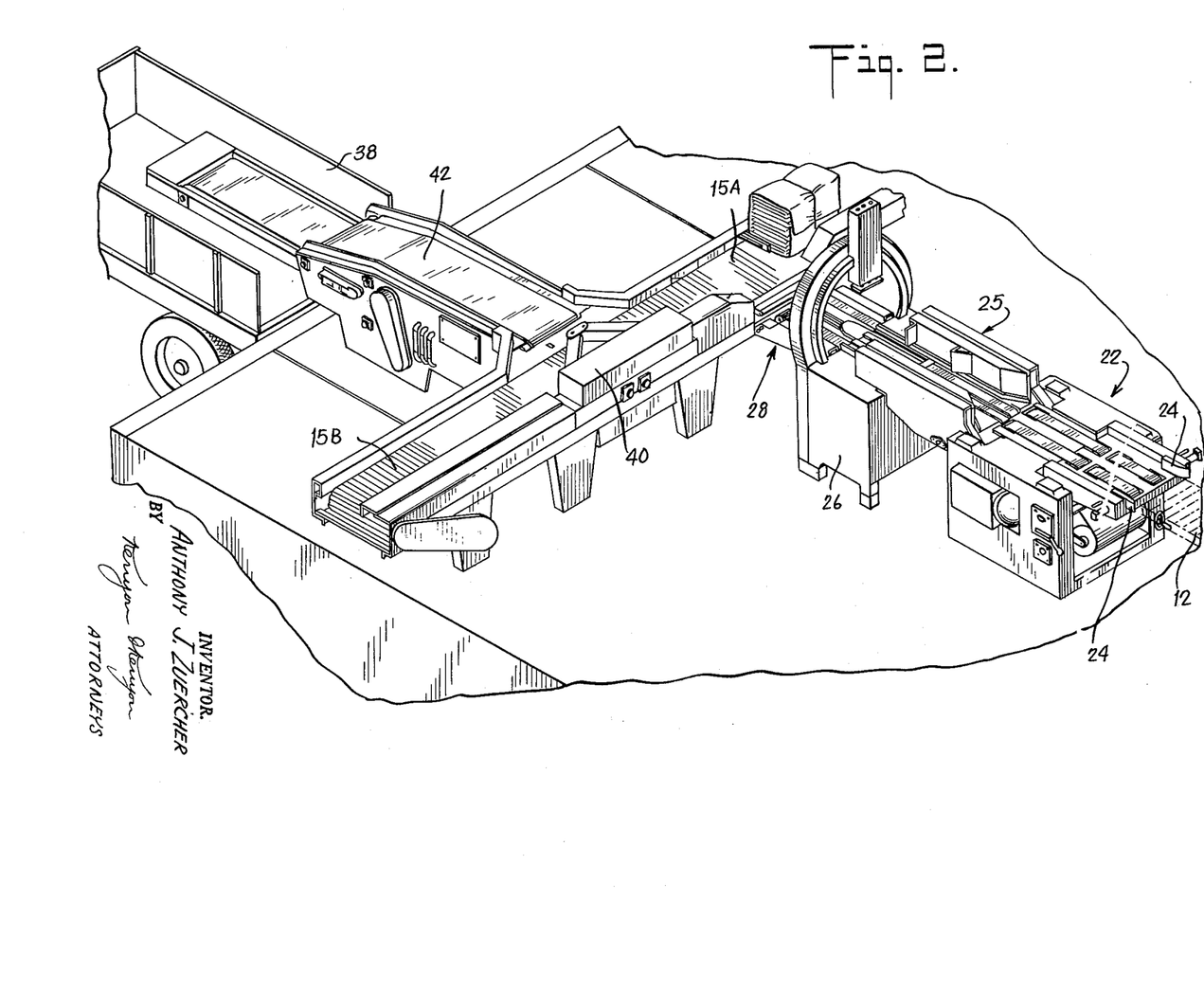
FIG. 2 is an isometric view of elements of the system of this invention.

Referring now to FIG. 1 there is schematically illustrated a typical system employing the teachings of this invention. The output of high speed presses 10 thru counter-stackers is fed to feeder conveyors 12. It will be noted that this is a closed loop system and that the feeder conveyors 12 may be operated in either direction. This permits the delivery to the dispatch conveyor system 14 to be from either or both of the two separate lines 16A and 16B which lead to the dispatch conveyor system 14 or in the event one of the lines, for example line 16A for any reason becomes jammed the flow may be routed around the system and out the exit of the other line 16B. The delivery to the feeding conveyors 12 may be from presses 10 or, where stuffing is required, may be from stuffing machines and/or counter-stackers. Along the feeding lines 16A and 16B there are provided dropleaf work tables 18. This permits the stacking or making up of split bundles at several different locations along the feeding lines 16A and 16B. The portion of the conveyor system which joins the two lines 16A and 16B is made up of curved feeder conveyor tables 20 and feeder conveyor tables 12. These latter conveyor tables may be hinged so that easy access to the center of the system may be had.

Near the exits of the lines 16A and 16B there is provided bottom and/or top wrapper applying machines 22. These may be preferably of the type illustrated and described in my application Serial No. 635,895 which is now Patent No. 2,879,636. As described in my patent, the bottom and/or top wrapper applying machine may have as a portion thereof an automatic deflector system which would operate to deflect improperly wrapped bundles from the lines 16A and 16B to another conveyor which is not shown in FIG. 1.

An additional element which may be added to the wrapper applying machine 22 consists of a bundle spacer 24 and bottom wrapper former 25, of the type illustrated and described in my copending application Serial No. 802,960. The purpose of the bundle spacer 24 is to provide a spaced interval between the bundles which, when related to the speed at which the bundles are being fed to the tying machine 26, permits the steady flow of bundles and takes into account the interval during which the bundle must remain stationary as it is being tied. This step is fully described in my application Serial No. 802,960.

The tying machine may be of any standard make and an inline feeder of the type illustrated and described in my application Ser. No. 802,960 is employed therewith.

Immediately following the tying machine 26 is provided a hinged access conveyor 28. The conveyor 28 has a switch associated therewith which, through connections to the bundle control elements on the dispatch conveyor tables 15A, 15B, 15C and 15D, operates bundle holding means on the dispatch conveyor tables 15A, 15B, 15C and 15D so that should, for any reason, a bundle be approaching the exit of the lines 16A or 16B at the same time a bundle is on the hinged accses conveyor 28, the bundle on the dispatch conveyor system 14 will be held up temporarily to permit the flow of the bundle from the tying machine 26 to proceed unto the dispatch conveyor 14. The operation of the feeder and dispatch conveyors at their junctions is fully described in my copending application Ser. No. 41,200, now abandoned.

The dispatch conveyor is made up of a number of separate bidirectional dispatch conveyor tables 15A, 15B, 15C and 15D. The separate tables 15A, 15B, 15C and 15D meet at points which correspond to the center of the loading stations 30, 32, 34, 36. Thus, as may be seen in FIG. 1, if loading station 30 has a truck 38 in position to be loaded, the bundle flow for loading station 30 may be from both lines 16A and 16B or from either separately. This would mean that the dispatch conveyor tables 15A, B and C would be operated in a manner such as to route the flow of both lines 16A and 16B to the single loading station 30. A tridirectional deflector 40 at loading station 30 diverts the flow coming from tables 15A, 15B and 15C onto a telescoping delivery table 42, or some other delivery means.

As may be shown in FIG. 1, the tridirectional deflector 40 is in an extended position so that all of the flow will be routed onto the telescoping delivery table 42. Counting means are associated with a portion of loading station 30 so that each bundle, after it is deflected by the tridirectional deflector 40 onto the telescoping delivery table 42, actuates the counting means which in turn is interconnected with control console 44. The control console 44 may be automatically programmed so that when the truck 38 has received the proper number of bundles the tridirectional deflector 40 automatically retracts insuring that no further flow can be directed to loading station 30 and the dispatch conveyor tables 15A, 15B and 15C will be reoriented to deliver bundles to the next loading station scheduled to receive bundles.

The tridirectional deflector 40 and its operation is fully described and illustrated in my copending application Ser. No. 39,055, now U.S. Patent No. 3,104,755, and the telescoping delivery table 42 is thoroughly illustrated and described in my copending application Ser. No. 39,054.

The system as a whole is provided with a number of features which make it possible to provide a simple and automatic handling of newspapers from output of the presses 10, stuffing machines and/or counter-stacker machines to the delivery truck 38. The entire system is designed to be controlled by the control console 44. Also since it is necessary before any delivery can be routed to any particular loading station that a delivery truck be in position to receive bundles of papers, there is provided an interconnection between the telescoping delivery table 42 and the control console 44 which indicates that a truck 38 is in position.

Figure 3:
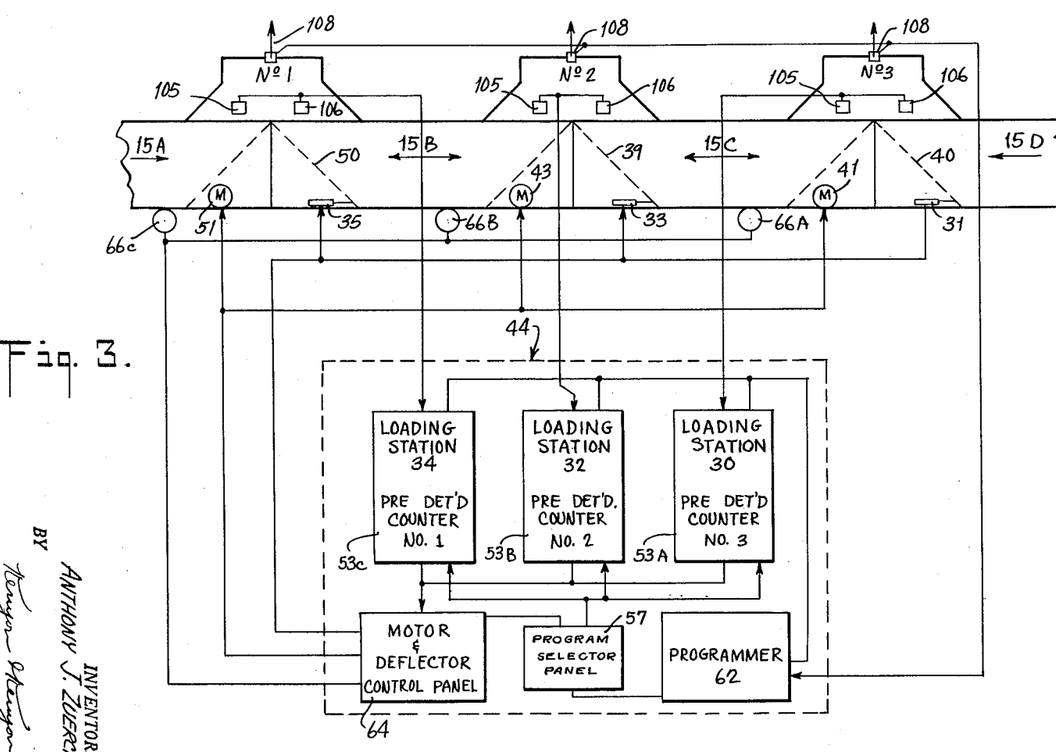
FIG. 3 is a schematic block diagram illustrating the elements of the system of this invention and their interconnections.
Figure 3A:
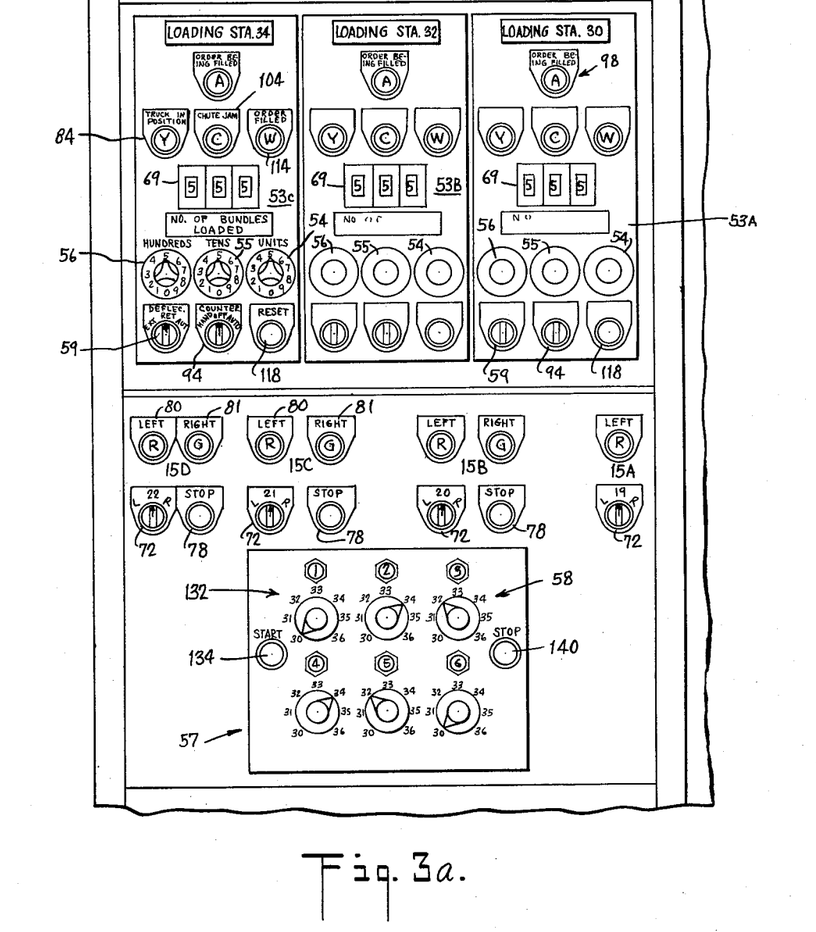
FIG. 3a is a drawing illustrating the control dials, indicators and buttons on a typical three-unit control console.

Once the control console operator either is notified by a light or other means on the control console 44 that a particular loading station is ready to receive papers he may route the flow of both lines 16A and 16B or a single line 16A or 16B into that particular delivery truck. As shown in FIG. 1 the delivery truck 38 in position at loading station 30 and the telescoping delivery table 42 is extended into the truck 38. The telescoping delivery table 42 is under the control of the truck driver or loader so that it is up to him to indicate when he is ready to receive. Assuming that the loader or truck driver is now ready to receive, the control console operator sets the count demand dials 54, 55, 56, as shown in FIG. 3a, for that portion of the control console 44 which governs the particular loading station involved. The control console 44 automatically determines the direction of operation of the bidirectional dispatch conveyor tables 15A, 15B, 15C and 15D so that the flow is routed toward loading station 30. In addition the control console 44 automatically operates to cause the extension and operation of the tridirectional deflector 40 positioned at loading station 30 so that the flow from the dispatch conveyor system 14 will be into telescoping delivery table 42 which is extended into the delivery truck 38. As each bundle is deflected onto the telescoping delivery table 42 a count is registered which is fed back to the control console 44. Until the total number of bundles called for by the count demand dials 54, 55, 56 has been filled, the system is locked so that all delivery is to the particular loading station 30. As soon as the proper count has been reached the control console 44 automatically retracts the tridirectional deflector 42 and adjusts the direction of operation of the bidirectional dispach conveyor tables 15A, 15B, 15C and 15D so that the flow is routed to the next loading sattion scheduled to receive.

As shown in FIG. 1, assuming that the truck 38 has received the proper number of bundles, the tridirectional deflector 40 will be retracted. Provided that the operator or loader of truck 46 has extended the telescoping delivery table 48 into the truck 46, the flow may then be to loading station 34. In automatic operation the control console operator would have preset the count demand dials 54, 55, 56 for loading station 34, and would have pre-programmed loading station 34 as the next to receive bundles. The automatic programmer would operate to extend the tridirectional deflector 50 and to reverse the direction of operation of dispatch conveyor tables 15B and 15C. The same flow as described above would continue until the truck 46 has received the proper number of bundles whereupon the deflector 50 would be retracted and the next loading station 32 or 36 ready to receive would be programmed to receive bundles. The operation continues automatically until the pre-programming is completed.

It may be desirable at certain locations on the dispatch conveyor system 14 to provide for bidirectional deflectors 52. Such locations would be on those portions of the dispatch conveyor system 14 where the flow can only be in one direction in order to deliver to loadnig station 36 which is beyond the junctions of lines 16A and 16B and the dispatch conveyor system 14.

As may be seen in FIGS. 3a, 4a, 4b and 4c, all of the elements associated with the dispatch conveyor system 14, loading stations 30, 32, 34 and 36, telescoping delivery tables 42, 43, 48 and 49 are interconnected. The control console 44, outlined by dotted lines in FIG. 3, has a number of separate components. There is a predetermined counter section 53A, 53B, 53C and 53D for each of the loading stations 30, 32, 34, 36. The predetermined counter section 53D for the loading station 36 is not shown since it is identical in operation with those shown for the other loading stations. In normal practice, only three predetermined counter sections 53 are provided in the modular unit, such as the portion of the panel illustrated in FIG. 3a. If additional loading stations, such as 36, are to be serviced, a separate control console would be interconnected with the one shown in FIGS. 3 and 3a.

In programmed operation, the predetermined counter sections 53A, B, C, etc., would be set automatically by the count information on the punch cards or the like by means of control signals from the programmer section 62. The programmer section 62 relates the intelligence contained on the punch cards or the like, and, in addition to setting the predetermined counter sections 53, provides signals to control the program selector 57 and to control the functioning of the motor control section 64. The motor and deflector control section 64 provides the following controls:

(1) The direction of operation of the dispatch conveyor table motors 66A, 66B, 66C and 66D for the respective dispatch conveyor tables.

(2) Deflector motors 41, 43 and 51 for the respective deflectors 40, 39, 50 and 52; and (3) For actuating the deflector swing mechanisms 31, 33 and 35.

Thus, there is provided a fully programmed delivery schedule that requires no operator and which derives its control from pre-selected punch cards or the like. As may be seen, the operations of the various interconnected systems are thereby controlled completely automatically for an entire edition's or day's circulation schedule.

For automatic operation, the deflector and counter-selector switches 59, 94 for each loading station are set on "Auto" by the control console operator and by hand operating the count demand dials 54, 55 and 56, which are the units, tens and hundreds for each separate predetermined counter in the predetermined counter sections 53A, 53B and 53C, the desired number of bundles is programmed for each loading station. Likewise, the control console operator sets the program selector dials 58, in accordance with the respective loading stations scheduled to receive delivery. Once this is done, and the programmer 62 started, the operation is automatic, in that the motor and deflector control section 64 orients the dispatch conveyor system 14 to route flow to the first loading station scheduled to receive, and extends and starts the motor of the tridirectional or bidirectional deflector associated with the selected loading station. The delivery of bundles to the first selected station continues until the bundle count set on the count demand dials for the particular predetermined counter associated with that station is satisfied. When the last bundle is counted, the program selector receives a signal through the predetermined counter 53A, 53B or 53C associated with the first selected station causing the operation of the motor and deflector control section 64 to reorient the dispatch conveyor system 14 to route flow to the next scheduled loading station, at the same time causing the appropriate deflector means to be extended as well as retracting that deflector associated with the first selected station. This automatic operation continues until the entire program preset by the control console operator is completed. However, as each loading station is satisfied and another delivery truck replaces the loaded one, the operator may reprogram that loading station to receive delivery of a predetermined number of bundles when the schedule formerly set has been completed. Thus, the automatic operation may be carried on until the entire circulation schedule has been satisfied.

In semi-automatic operation, the control console operator manually sets the count demand dials 54, 55, 56 for each predetermined counter section 53 and orients the direction of flow of conveyor tables 15A, 15B, 15C and 15D by using the manual selector switches 72. The deflector selector switch 59 is placed in the "Auto" position and the counter selector switch 94 is turned to the "hand" position. Thus in semi-automatic operation, the automatic control is limited to retracting the appropriate deflector when the count set on the demand dials for the loading station being serviced is satisfied. The program selector panel does not have any function during semi-automatic operation.

In manual operation the separate portions of the systems are each controlled manually and the control console as such is not required. The operator manually operates the control for the dispatch conveyor section motors 66A, 66B, 66C and 66D, as well as the deflector swing mechanisms 31, 33 and 35, by manually operating the controls associated with each of these elements.

Each of the loading stations where there is a tridirectional deflector has two count sensing elements 105, 106 (only one is required for those loading stations where there is a bidirectional deflector). A signal from these operates totalizing register wheels 69 and gives the operator a visual check as to the total number of bundles delivered to any particular loading station at any given time. By comparing the number of bundles set on the count demand dials 54, 55, and 56 the operator can determine the total number of bundles remaining to be delivered.

The system of this invention is such that programmed, automatic or semi-automatic control is possible even though a delivery truck is not in position at the proper time or one of the delivery tables is jammed. A jam sensing element 108 is provided at the exit from each of the loading stations past the position of the count sensing elements 105, 106. Should for any reason the bundles being delivered to a particular station not be removed, the jam sensing element 108 operates the system to retract the deflector at that station. A signal will be transmitted to the programmer 62 which will operate to halt the flow to the particular jammed loading station and advance the program to the next station which is ready to receive. The count will remain on the predetermined counter 53 for the jammed station so that the operator can see that the order for the particular loading station which was jammed has not been filled. Once the jam has been cleared, the jam sensing element 108 again feeds a signal to the programmer 62 which directs the flow back to the original loading station that was jammed. The flow resumes to formerly jammed loading station until the proper number of bundles has been delivered. When the formerly jammed station's order is completed, the schedule is advanced to that station which was receiving when the jam signal was operative. FIG. 3a is an illustration of a typical panel for a control console 44 which operates three separate loading stations. As may be seen, each of the predetermined counter-sections 53 is provided with a number of lights which indicate to the control console operator the condition of the particular loading station at any given time. These lamps correspond with the elements shown in FIGS. 4a, 4b and 4c and will be discussed in that connection below.

There is also provided for each one of the loading station's predetermined counter sections 53 a total count indicator 69 as well as the count demand dials, 54, 55, 56. Additionally, there is provided a deflector control selector switch 59, a counter control selector switch 94 and a reset button 118 which automatically resets the counter once the order for that particular loading station has been filled. These elements will also be described below.

In the motor control section 64, controls are provided for each of the dispatch conveyor table motors 66A, 66B, 66C and 66D. The number of dispatch conveyor tables required to service four loading stations is dependent upon the number of feeding conveyors and the location of their exits relative to the loading stations. If, however, the infeed location is excluded from consideration, the number of dispatch conveyor tables required to service any given number of loading stations is one less than the desired number of loading stations. Control switches 72 for left and right operation and a stop button 78 for stopping the separate conveyors are shown for four of those stations. It will be appreciated that the portion of an additional control console module illustrated to the right of FIG. 3a contains the remaining controls for that deflector which is to service a loading station to the right of loading station 30 as well as servicing loading station 30.

The program selector section 57 is provided with a six sequence control in that six separate selector dials 58 are provided, each of which may be individually set to provide for programmed delivery to loading stations 30, 32, 34, etc. These dials 58 may, of course, be set in any manner as desired by the control console operator in automatic operation or may be controlled by a card reading device as described above in the programmed operation. There is also provided a start button 134 and stop button 140 which actuates the program selector section 57 when automatic control is desired.

Figure 4A:
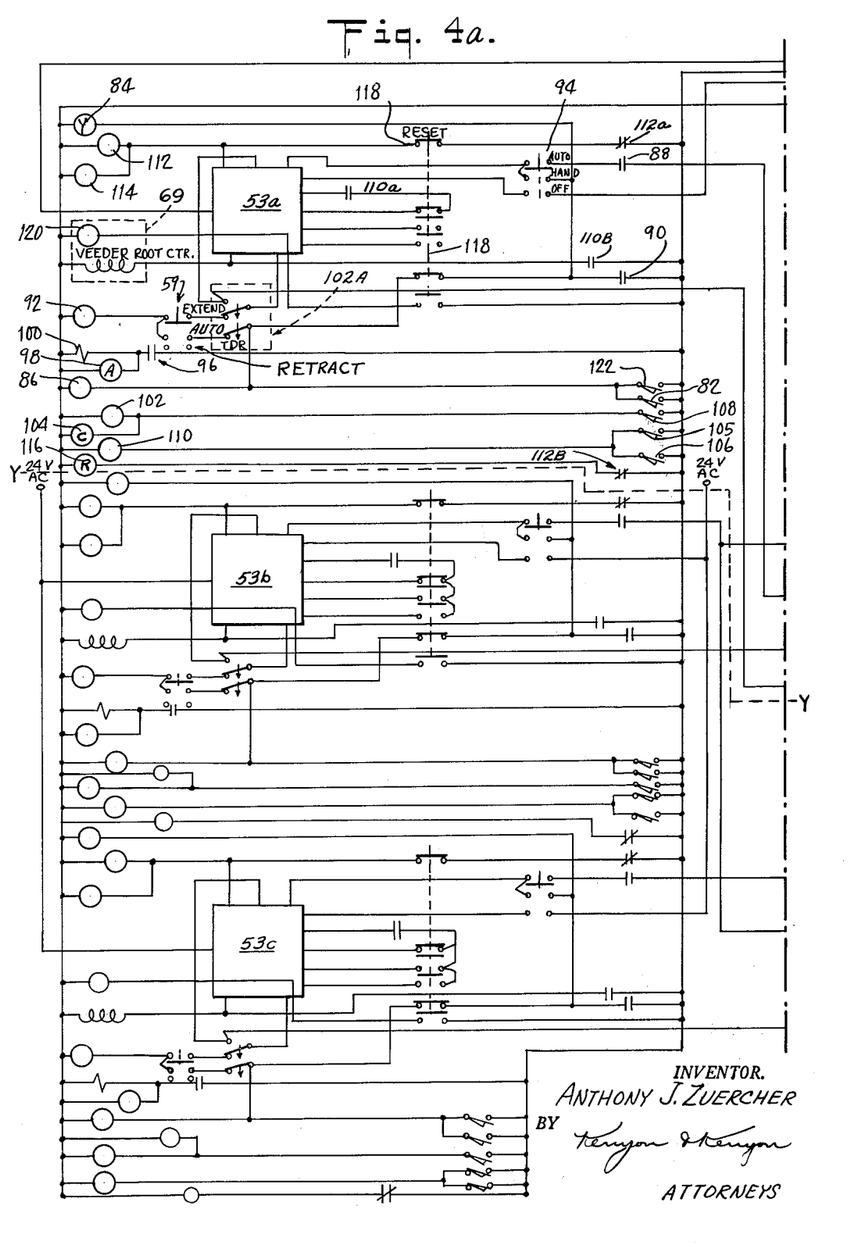
FIGS. 4a, 4b and 4c are wiring diagrams for the control system of this invention.
Figure 4B:
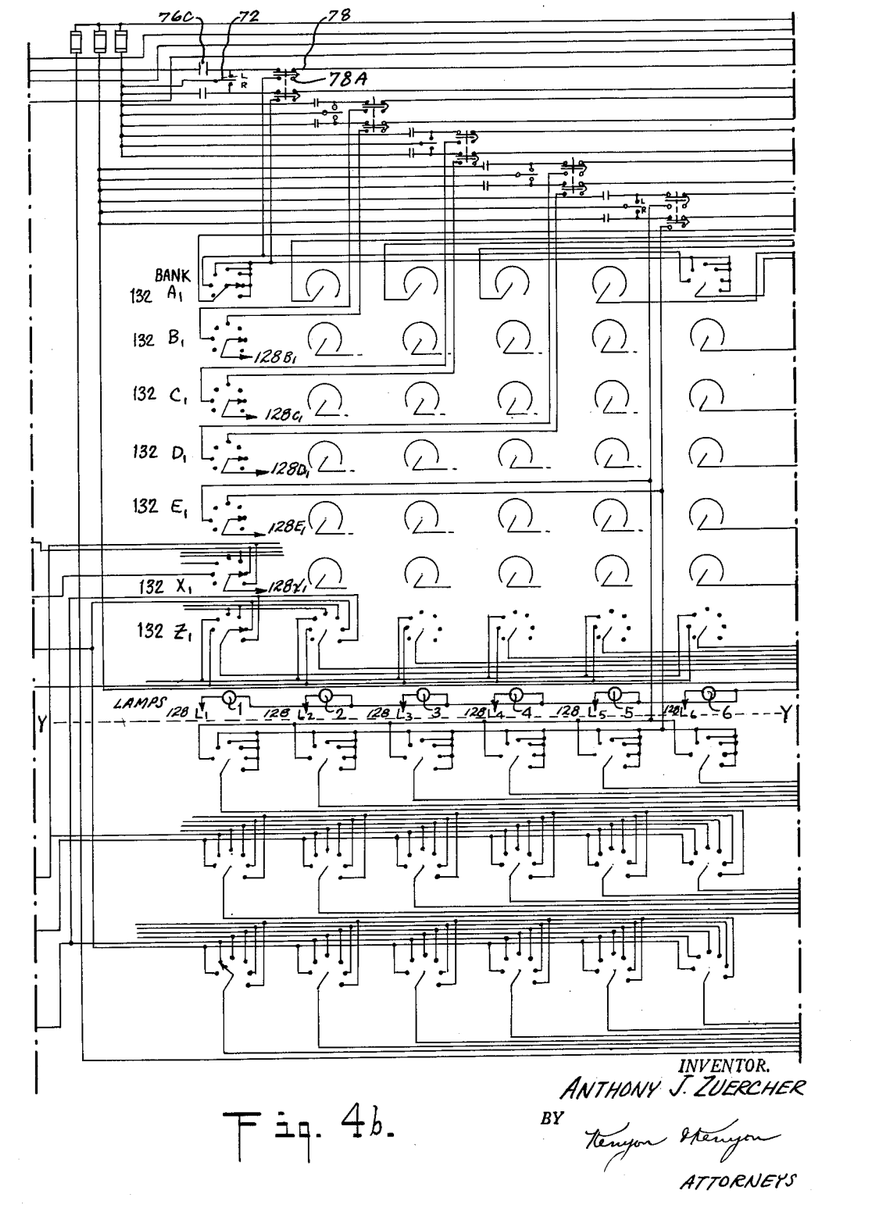
Figure 4C:
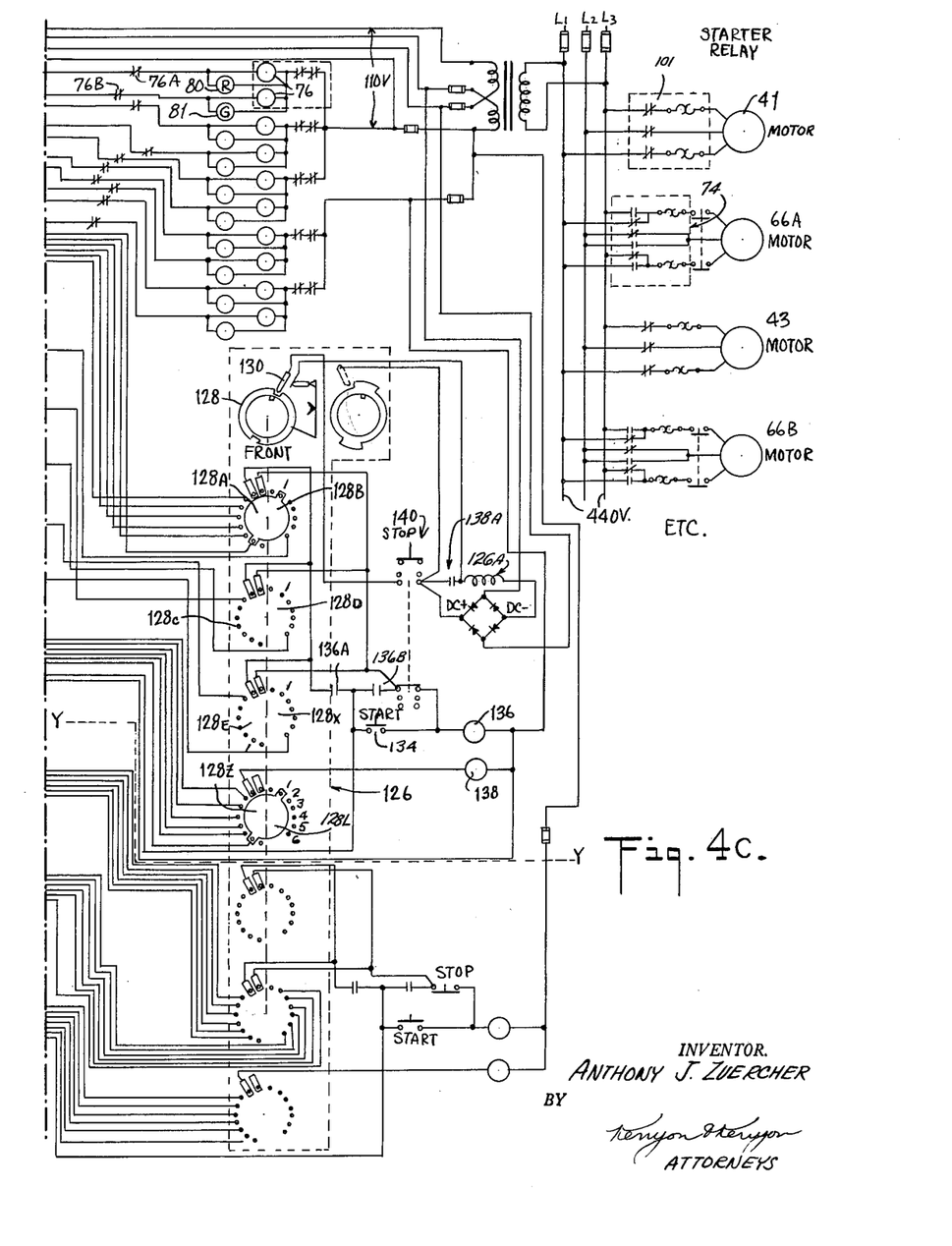

In order to understand the various elements described above in FIGS. 3 and 3a, a detailed description of FIGS. 4a, 4b and 4c will now be given. FIGS. 4a, 4b and 4c illustrate a wiring diagram and will be described in connection with automatic and manual operation. It will be appreciated that for fully programmed operation a card reading device is used to control the program selector and in addition provides controls for operating the predetermined counters individually in accordance with the programmed delivery schedule.

The first operation to be described will be the manual operation. As shown above each of the dispatch conveyor table drive motors 66A, 66B, 66C and 66D are controlled by three positioned selector levers 72 which are connected to each dispatch conveyor table motor by means of a reversing motor contactor or starter 74. Manual actuation of the three positioned selector lever 72 to the right or left closes the normally open contacts 76C to energize the right or left coil of the motor starter 74 to operate the dispatch conveyor table into motion in the desired direction. Depressing the stop button 78 drops the relay coil 76 out, stopping the selected dispatch conveyor motor. However, assuming that the stop button 78 has not been depressed, the motor continues to run in the desired direction either right or left as long as the holding contacts 76C maintain the energization of the right or left coil of the motor starter 74. Indicating lights 80, 81 (the red light 80 being for indicating that the conveyor table is operating to the left and the green light 81 indicating that the conveyor table is being operated to the right) are wired in parallel to the respective coils. These lights 80, 81 serve to give the control console operator a visual picture of the direction of travel of each conveyor table. Each relay coil 76 is protected by electrical interlock contacts 76A, 76B in order to prevent both relay coils 76 from being energized at the same time. To sum up the above by turning the selector lever 72 to the left, current flows through the normally closed contacts 78A on the stop button 78, through the electrical interlock contacts 76A, reversing starter coil 76 and lighting the red indicator light 80. Contacts 76C seal the circuit. Conveyor table 15a is now running to the left. It will be appreciated that the sequence for setting up conveyor table 15a to operate in the opposite direction is identical with the above with the exception that the motor selector lever 72 is positioned to the right hand condition.

When a truck driver, in position at a loading station, extends his telescopic delivery table, a limit switch 82 is actuated lighting a yellow "Truck-in-Position" indicating lamp 84 on the control console 44 and energizing a relay 86. In turn the two pairs of normally open contacts 88, 90 are closed, completing circuits to the respective predetermined counter section 53a and deflector drive motor control relay starter 92. The control console operator noting that a truck is in position and waiting to receive bundles turns the counter selector switch 94 for that particular loading station to the "Hand" position. The control console operator then sets the desired count on the units, tens, and hundreds dial of the count demand dials 54, 55 and 56 illustrated in FIG. 3a which, of course, is a portion of the predetermined counter section 53 for the particular loading station involved. If the deflector control selector switch 59 is set on "Auto," this supplies current, by virtue of the internal counter circuitry, to energize the deflector starter relay 92 causing its normally open contacts 96 to close, lighting the amber "Deflector Extended" light 98 and energizing the coil of a pneumatic solenoid valve 100 which in turn causes the particular deflector at that loading station to be extended. In addition, the current which flows to the coil of relay 92 also passes through the normally closed contacts 102A of time delay relay 102. This time delay relay is preferably one which is a special type such as the Heineman Sil-O-Netic. This time delay relay 102 is operated by the jam limit switch 108. It will be noted that a clear "Jam" indicating light 104 is wired in parallel with the time delay relay 102 so that when the circuit is closed by the time delay relay 102, the lamp 104 will indicate to the control console operator that that particular chute is jammed. As each bundle is deflected onto the telescoping delivery table for the particular loading station being serviced, count limit switches 105 and 106 are operated as well as the jam limit switch 108. On passing over the jam limit switch 108, because of the connection between the jam limit switch 108 and the relay 102, a magnetic field begins to build up in relay 102. Assuming a condition where the bundles pass over the jam limit switch 108, permitting its contacts to open prior to passage of the variable predetermined time delay necessary for energizing relay 102, the jam circuit is left inoperative. However, if the jam limit switch 108 is held closed for the variable pre-determined period of time necessary for the operation of relay 102 permitting its contacts 102A to open, there is an interruption of the current flow to the holding coil of deflector relay 92. The interruption of current to the holding coil of deflector relay 92 causes contacts 96 to open and thus interrupts current to the pneumatic valve solenoid 100 and the deflector motor contacts 101 for the deflector drive motor 41 to be dropped from the circuit. Simultaneously, the clear "Jam" 104 indicating light is lit. Thus in a case of a bundle stall or jam, the active deflector is automatically retracted, the "Deflector Extended" indicating light 98 is extinguished and the control console operator is advised of the current situation. When the jam or stall condition is cleared, the jam limit switch 108 contacts open, de-energizing relay 102 and the deflector is again extended. The extension of the deflector and the clearance of the jam extinguishes the "Jam" indicating light 104.

As each bundle passes over the counting switches 105, 106, their normally open contacts intermittently open and close, thus intermittently energizing the coil of relay 110. One set of the normally open contacts of relay 110A closes, supplying an impulse to the predetermined counter portion 53a and the second set of normally open contacts 110B of relay 110 pulses a signal to the totalizing counter 69. If the deflector selector switch 59 is in the automatic position and the number of pulses by the predetermined counter coincides with the desired number of bundles previously set on the counter dials and the counter selector switch is set on "Hand" position, the internal circuitry of the predetermined counter causes the circuits of the deflector starter relay 92 to open. This causes the deflector motor to stop, the deflector to retract and the amber "Deflector Extended" indicating light 98 to be extinguished. In this condition the "Count Completed" relay 112 is sealed in by its normally closed contacts 112A. The frosted white "Count Completed" indicating lamp 114 on the console is lit. The "Count Completed" red indicating lamp 116 located on the truck loading dock indicates to the driver that his order has been filled.

If, at any period during the counting and delivery of bundles to any loading station, the control console operator finds it necessary to interrupt the flow, all he is required to do is to turn the deflector switch 59 to "Retract," thereby opening the circuit to the pneumatic solenoid valve 100, the deflector drive motor starter 92 and the amber "Deflector Extended" lamp 98. The count which has been registered on both the predetermined and the totalizer counters will be retained and upon the return of the deflector selector switch 59 back to "Auto" or "Extended" both counters will function as though they were never interrupted. Thus the system has a built-in memory to permit the control console operator to have a maximum of flexibility in the operation of the system of this invention.

The "Count Completed" frosted light 114 and "Truck-in-Position" indicating lamp 84 will remain lit after the order has been filled until the control console operator depresses the Reset Button 118. The number of bundles registered on the totalizer counter 69 also remains until the dispatcher manually resets it through the operation of the reset button 118 and motor 120.

It is necessary for the telescoping loading conveyor to be extended in order to actuate the "Truck-in-Position" limit switch 82 and energize "Truck-in-Position" relay 86, since both contacts 88 and 90 of the relay 86 must be closed before current can be supplied to the portion of the circuit supplying the deflector and counters. However, once the "Truck-in-Position" switch 82 has been actuated and the contacts 88, 90 of relay 86 have been closed, the "Truck-in-Position" switch 82 is bypassed providing a sealed circuit for the deflector and counters. Thus it is not possible for the control console operator to route bundles accidentally to a loading station which does not have a truck stationed in position and at which the telescopic loading conveyor has not been extended without first operating the "Truck-in-Position" relay 86. The deflectors and the counters remain in the circuit even if the driver were to prematurely return his loading conveyor to the retracted position. Therefore, there would be continuation of flow to this loading station until either the order was completed or the operator manually retracted the deflector.

In parallel with "Truck-in-Position" switch 82, there is provided a "Close to Test" limit switch 122, that operates the system in the same way as does the "Truck-in-Position" limit switch 82. The advantage of the parallel switch 122 is twofold since it permits trouble shooting and maintenance without requiring a truck to be in position or to have someone extend the loading conveyor. Secondly, each loading station in case of emergency, can be used as an accumulator or storage area for bundles.

For automatic operation, both the counter selector switch 94 and deflector selector switch 59 are turned to "Auto." The "Stop Buttons" 78 for each dispatch conveyor section are locked in an automatic start position by means of an outer locking ring positioned around these buttons at the control console.

As in the case in the above described manual operation, the driver by extending his loading conveyor actuates the counter and deflector system.

As described above, the control console 44 is equipped with a program selector panel 57. By means of the panel 57, assuming a condition where there are trucks in position at a number of loading stations, any desired sequence of operation can be pre-set so as to deliver bundles to any of the loading stations in any desired sequence. In the description below, there is assumed that there will be available a family of six loading stations so that a program may be set on the automatic program selector panel 57 for each of the six loading stations in advance of the delivery to the first of the loading stations. In other words, the control console operator can program in advance to the six loading stations a total of six orders and the deflectors for each of the loading stations will automatically advance and retract upon the completion of the order as well as each of the dispatch conveyor sections being operated automatically so as to deliver the bundles to the loading stations in the desired sequence.

As an example of how this operation would be conducted, again assuming the three loading stations described above are to be serviced, a control operator could service the following delivery schedule:

Sequence #1—263 bundles to loading station 30
Sequence #2—181 bundles to loading station 34
Sequence #3—62 bundles to loading station 32
Sequence #4—100 bundles to loading station 34
Sequence #5—203 bundles to loading station 32
Sequence #6—35 bundles to loading station 30

As an initial step, the control console operator simply sets the count demand dials 54, 55, 56 for each of the loading stations in accordance with the number of bundles listed above. The next step is to program the respective program selector dials so that the delivery to the separate loading stations follows the desired sequence. As shown in FIG. 3a, the six sequences are represented by the six dials 58. The sequence of desired operation given above would be dialed in so that as the program is carried out, the delivery would take place automatically until the six sequences had been completed.

The nerve center of the programming panel is a rotary stepping relay 126 shown in FIG. 4c and a series of tap switches 132 which are illustrated in FIG. 4b. The rotary stepping relay 126 is made of a stack of wafers or layers 128A, B, C, D, E, X, Z and L, each layer of which is fed with current from a commutator strip 130. Current flows into the commutator 130 and out any one of six possible routes or paths.

Each of the six progressive steps around the circumference of the wafer determines how far along the total of sequences the program has progressed. Each of the wafers in turn is assigned a definite control function. For example, wafers 128A, B, C, D, and E control the motor starter relays for dispatch conveyor section motors 66A, B, C, etc. Wafers 128X and Z supply control current to the predetermined counter sections.

The six tap switches 132 are also made up of a stack of seven wafers or switch layers identified as 132A, B, C, D, E, X and Z. Layers 132A through E are used to select the direction of travel of the conveyor sections driven by motors 66A through 66E. Layer X is used to operate the deflector and predetermined counter. Layer Z carries the count completed signal from predetermined counter to the stepping switch 126 in order to advance it to the next step in the program.

Assuming the sequence of operation as set forth above for an installation similar to FIG. 1, the first tap switch would be turned until its pointer was in line with loading station 30. The 132A layer of tap switch 132 would control the direction of travel of the conveyor 15A so that the flow was to the left. Layers 132B, C and D would control their respective conveyors so that the flow was to the right. Layer E would be blank as there is not another conveyor assigned to the operation. X wafer would complete a circuit to deflector 40 through its predetermined counter.

Once the above information is set on both the count demand dials for the respective loading stations and the tap switches 132 have been oriented to program the delivery in the desired sequences, the start button 134 on the program selector panel 57 is depressed, closing its normally open contacts and thus providing current for energizing the coil of relay 136. This causes the two sets of normally open contacts 136A and 163B for relay 136 to close, supplying current to the stepping relay wafers 128 and from there to the tap switch 132 at the first position of each of the wafers 132A, 132B, 132C, etc. The current arriving at the tap switches 132 is further routed to perform its designated control function. This current, as described in the manual operation above, activates counter for loading station 30 and by utilizing its internal circuitry and switching, deflector starter 92 is energized causing its normally open contacts 96 to close, which in turn causes the lighting of the amber "Deflector Extended" indicating light 98 and by energizing pneumatic solenoid coil 100, starts the deflector drive motor 41 and energizes the pneumatic solenoid valve 100 for the deflector 40 at loading station 30. In addition to actuating the predetermined counter for loading station 30, the remaining wafers on 132 are wired in parallel with the manual directional conveyor motor starter selector switches 72 for each conveyor drive motor starter in such a manner that either the right or left coil of the conveyor drive motors are automatically energized and start the dispatch conveyor sections 15A through 15D in a direction which will automatically orient the flow to loading station 30. During this #1 phase of sequences of the program selector panel's operation, the #1 light will be lit on the program panel indicating that the entire system is functioning and bundles are being delivered to the loading station 30 and further indicating that the first step in the automatic program is being processed.

Once the desired number of bundles has been delivered and the first phase of operation is over, a pulse is supplied from the predetermined counter for loading station 30 to the rotary stepping relay 126 causing it to advance to the next position. The pulse comes through the tap switches 132 through the Z bank of wafers and from there to stepping coil 126. This pulse energizes relay 138 causing its normally open contacts 138A to close, energizing the stepping coil 126A of the steping relay 126. This advances the stepping relay 126 one position. Delivery to loading station 34 which is the next step in the automatic programming proceeds and the complete cycle as described above repeats itself which is in accordance with the program set up above. As above, the deflector 50 is extended and the deflector drive motor 51 is put into operation. The respective conveyor motor starters will have re-oriented themselves to supply loading station 34. As soon as the first phase was over, the #1 lamp was extinguished and as soon as the second stage begins the indicating lamp #2 will be lit.

In such a manner, the entire system will progress through the six pre-set orders. If the control console operator does nothing upon the counting out or completion of phase #6, the complete system will stop. However, if as soon as each respective sequence is completed and the program selector panel indicator lights are successively extinguished, and if the control console operator has re-programmed each loading station, at the completion of phase #6, the system will return to phase #1 and continue as before. Of course, the control console operator will have to re-set the count demand dials for the new count which is to be delivered by the predetermined counter for the next desired loading station to be serviced. Consequently, the result of the system is that it will operate so long as there remains an unfilled order in any one of the pre-determined counters which it controls.

The control console operator may at his option discontinue automatic programming at any time. By depressing the stop button 140, the automatic program selector panel is removed from the circuitry and the system reverts to manual operation. The stop button 140 has a control refinement built into it. By depressing the stop button 140 partially, the normally closed contacts are opened, de-energizing the program selector panel 57. After the need for manual operation is met, the operator can return to automatic operation by depressing the start button. This would cause the program panel to take up at exactly the same point in its cycle at which it was interrupted.

If, however, the stop button 140 is totally depressed, the normally open contacts at its top are closed energizing the stepping coil of the stepping relay 126 and without further action on the part of the operator, the former program is removed and the panel is re-set to the initial starting stage of the #1 program setting. Then if the control console operator completes his manual operation and depresses the starter button 134 on the program panel, the automatic programming will commence on the #1 stage provided, of course, that the pre-determined counters for the loading stations have been re-set. If some of the counters have been re-set but there remain certain ones in a partially completed status, the program will automatically step ahead to the first pre-determined counter which has not been satisfied.

The system, as shown in FIGS. 3, 3a, 4a, 4b and 4c, is a highly flexible one. The control console operator has complete command over the circulation schedule and can program delivery to waiting delivery trucks in any desired sequence. At any point during automatic operation, the operator may revert to manual operation without upsetting his already programmed schedule. The built-in memory of the control system and its self-operating features are such that virtually all of the manual labor formerly required in a newspaper mailroom is eliminated.

As a further improvement, the relatively complex wiring of the control console 44 is vastly simplified by the novel way in which various components are mounted therein. Thus in FIG. 5, there is shown a perspective view of a portion of the control console in which certain elements have been pre-packaged and which are mounted on sliding panels 142. Thus the motor starter and its directional coils as well as all of the associated circuitry are for each of the conveyor sections mounted on a separate chassis 143 which plugs into a bread board on the panel 142 and may be removed as a unit. In addition, the circuitry for the program selector panel 57 is mounted in a chassis 144 which likewise plugs into a bread-board which is part of the panel 142. The pre-determined counters for each of the loading stations served by the control console 44 are likewise mounted on separate chassis 145 which, as described above, are plugged in the sliding panel 142. The panel 146 carries a similar set of separate chassis for another three loading station set of controls.

Figure 5:
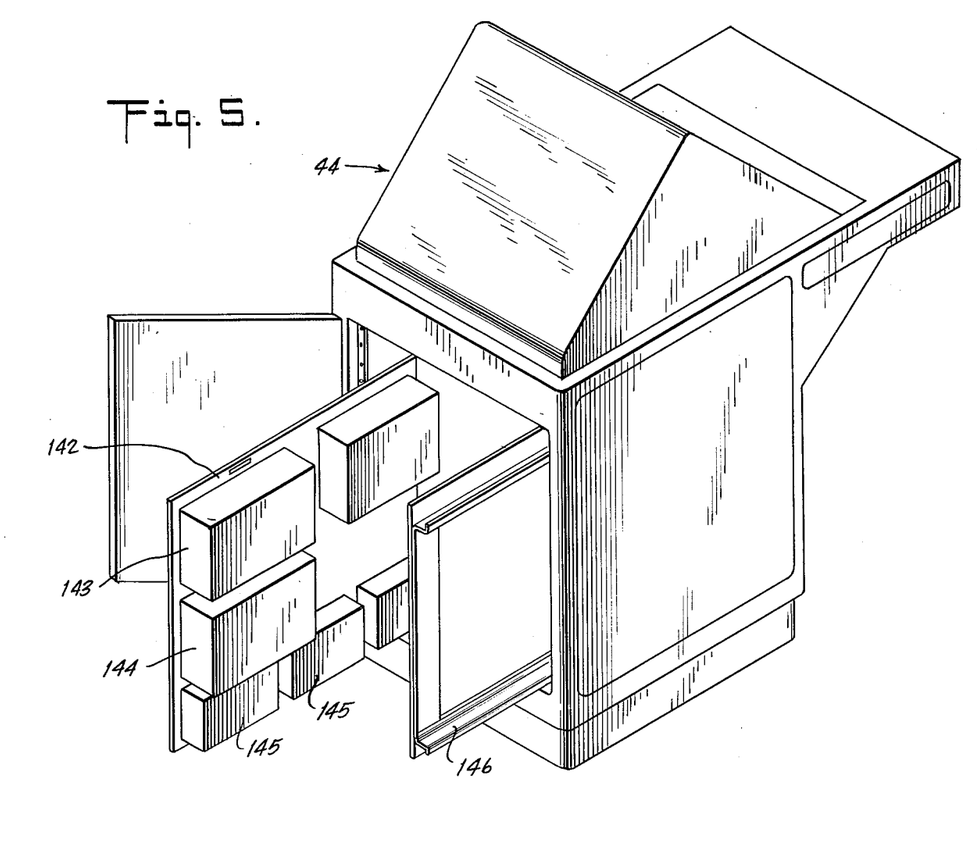
FIG. 5 is a perspective view of the control console illustrating the mounting of the control elements therein.

The advantage of having the controls mounted in easily detachable separate units is that, should for any reason there be a failure, by replacing the separate chassis one by one, maintenance personnel could readily determine where the fault lies so that a separate chassis of the appropriate kind may be taken from stock to replace the defective unit. This cuts down to a great degree the amount of time the system would be out of operation due to any electrical failure.

The system of this invention has been described above in connection with a typical three loading station installation. It will be appreciated that in most instances that more than three loading stations will be involved and a multiple of modular units would make up the control console. Thus the wiring diagram FIGS. 4a, 4b and 4c are shown as including provisions for a number of additional loading stations to be serviced.

As a further aid to the simplicity of operation of this invention, each of the pre-determined counter panels is arranged on a different brightly colored background. The cover for each deflector is painted the same color as the panel for its pre-determined counter section so that the operator can visually associate the proper deflector with its pre-determined counter section. This, of course, is in addition to indicia which is carried on each pre-determined counter panel and deflector cover which identify the two by the same number.

The system has been described herein as one in which the deflectors transfer the material on the dispatch system 14 directly onto the loading conveyors. However, in instances where there are more than one floor in a newspaper plant, there may be employed, between the dispatch conveyor system 14 and the loading conveyors, a gravity chute which carries the bundles deflected to the loading conveyors.

The description above has been in connection with a preferred embodiment. However, it will be appreciated that there are modifications which can easily exist which do not depart from the spirit of the teachings of the system of this invention. For example, certain of the modular components may be used separately or in conjunction with less than the whole system.

I claim:

1. A material handling system including dispatch conveyor means, a plurality of separate feeding conveyor means for carrying discrete elements to said dispatch conveyor means at the junctures thereof, automatically operating holding means for preventing interference between elements at each juncture of said feeding and dispatch conveyor means by holding a discrete element on one of said feeding and dispatch conveyor means when another element on the other of said feeding and dispatch conveyor means is adjacent to said juncture of said feeding and dispatch conveyor means, said dispatch conveyor means comprising a plurality of bidirectionally operating dispatch conveyors positioned end to end with respect to each other, a plurality of loading stations, each of said loading stations being positioned at the junctures of said separate dispatch conveyors, extendable and retractable deflector means positioned at each of said junctures for routing flow on said dispatch conveyors to said loading stations, count sensing means at said loading stations for providing a count of the discrete elements of said material entering said loading stations, and control means having predetermined counter means for each of said loading stations associated therewith, means for presetting said counter means to any given number of discrete elements, means interconnecting said count sensing means and said counter means, said control means having means for extending one of said deflector means at any selected loading station and for orienting the flow on said dispatch conveyor means towards said extended deflector means whereby flow will be deflected to said selected loading station only, and means operated by said counter means for retracting said extended deflector when the pre-set number of discrete elements have entered said loading station.

2. The device of claim 1 having programming means included in said control means for successively extending selected deflector means and successively orienting the flow on said conveyors to the successively selected deflector means, in any desired pre-selected sequence.

3. The device of claim 2 having intelligence reading means associated with said control means for operating said counter means and said programming means.

4. The device of claim 2 having means associated with said programming means and said counter means for permitting a temporary halt of delivery of material to a first loading station prior to the completion of the delivery of the predetermined number of elements to said loading station pre-set in said counter means, the advancement of said program to the next loading station scheduled to receive delivery and the return to said first loading station in order to complete the delivery thereto of the remainder of elements it was scheduled to receive.

5. An automated newspaper mail room comprising a dispatch conveyor means, a plurality of separate feeding conveyor means, all of which feed stacks of newspapers through wrapping and tying means onto said dispatch conveyor means at the junctures thereof, automatically operating holding means for preventing interference between newspaper stacks at each juncture of said feeding and dispatch conveyor means by holding a newspaper stack on one of said feeding and dispatch conveyor means when another newspaper stack on the other of said feeding and dispatch conveyor means is adjacent said juncture of said feeding and dispatch conveyor means, said dispatch conveyor means comprising a plurality of separate bidirectionally operating conveyor tables positioned end to end with respect to each other, a plurality of extendable and retractable deflector means positioned along said dispatch conveyor means at the juncture points of said conveyor tables to a like plurality of loading stations, loading means positioned at each of said loading stations to carry said stacks into delivery conveyances, and control means for orienting the flow of stacks on said dispatch conveyor means to any one of said loading stations and for extending the deflector for said loading station to route stacks onto the loading means at said loading station.

6. The device of claim 5 wherein each said feeding conveyor means is bidirectional, and including joining means for joining the ends of said feeding conveyor means opposite to the junctures of said feeding conveyor means and said dispatch conveyor means comprising temporary moving storage means for use when any one of said feeding conveyor means is temporarily prevented from delivering stacks to said dispatch conveyor means.

7. The device of claim 5 wherein said control means include stack count sensing means at each of said loading stations connected to predetermined counter means for each of said loading stations, said counter means having count demand dials which may be pre-set for any predetermined number of stacks scheduled for delivery to each loading station, means for extending the deflector at any selected loading station and for orienting the direction of operation of said conveyor tables to route flow to said extended deflector and means for retracting said extended deflector when said stack count sensing means has counted the number of stacks entering said loading station that has been pre-set on said count demand dials.

8. The device of claim 7 wherein said control means includes programming means for automatically operating said deflector extending and retracting means and said conveyor table orienting means whereby to deliver stacks to said loading stations in any desired sequence automatically in accordance with a pre-set program schedule.

9. A material handling system including a plurality of bidirectionally operating separate conveyor means positioned end to end with respect to each other, a plurality of loading stations, each of said loading stations being positioned at the junctures of said conveyor means, extendable and retractable deflector means positioned at said juncture for routing flow on said conveyors to said loading stations, count sensing means at said loading stations for providing a count of the discrete elements of said material entering said loading stations, and control means having predetermined counter means for each of said loading stations associated therewith, means for pre-setting said counter means to any given number of discrete elements, means interconnecting said count sensing means for extending one of said deflector means at any selected loading station and for orienting the flow on said conveyor means towards said extended deflector means whereby flow will be deflected to said selected loading station only, and means operated by said counter means for retracting said extended deflector when the pre-set number of discrete elements have entered said loading station, said material handling system having programming means included in said control means for successively extending selected deflector means and successively orienting the flow on said conveyors to the successively selected deflector means, in any desired pre-selected sequence, said material handling system having extendable and retractable loading means positioned at each of said loading stations and means connecting said loading means to said control means whereby flow of material into any loading station will be prevented until said loading means is extended.

10. A material handling system including a plurality of bidirectionally operating separate conveyor means positioned end to end with respect to each other, a plurality of loading stations, each of said loading stations being positioned at the junctures of said conveyor means, extendable and retractable deflector means positioned at said juncture for routing flow on said conveyors to said loading stations, count sensing means at said loading stations for providing a count of the discrete elements of said material entering said loading stations, and control means having predetermined counter means for each of said loading stations associated therewith, means for pre-setting said counter means to any given number of discrete elements, means interconnecting said count sensing means for extending one of said deflector means at any selected loading station and for orienting the flow on said conveyor means towards said extended deflector means whereby flow will be deflected to said selected loading station only, and means operated by said counter means for retracting said extended deflector when the pre-set number of discrete elements have entered said loading station, said material handling system having programming means included in said control means for successively extending selected deflector means and successively orienting the flow on said conveyors to the successively selected deflector means, in any desired pre-selected sequence, said material handling system having extendible and retractable loading means positioned at each of said loading stations and means connecting said loading means to said control means whereby flow of material into any loading station will be prevented until said loading means is extended, wherein extending and retracting said loading means is separately controlled by loading personnel.

11. In an automated newspaper mail room, feeding conveyor means for carrying stacks of newspapers through wrapping and tying means to dispatch conveyor means, said dispatch conveyor means comprising a plurality of separate bidirectionally operating conveyor tables positioned end to end with respect to each other, a plurality of extendable and retractable deflector means positioned along said dispatch conveyor means at the juncture points of said conveyor tables for deflecting said stacks from said dispatch conveyor means to a like plurality of loading stations, loading means positioned at each of said loading stations to carry said stacks into delivery conveyances, and control means for orienting the flow of stacks on said dispatch conveyor means to any one of said loading stations and for extending the deflector for said loading station to route stacks onto the loading means at said loading station, said control means include stack count sensing means at each of said loading stations connected to predetermined counter means for each of said loading stations, said counter means having count demand dials which may be pre-set for any predetermined number of stacks scheduled for delivery to each loading station, means for extending the deflector at any selected loading station and for orienting the direction of operation of said conveyor tables to route flow to said extended deflector and means for retracting said extended deflector when said stack count sensing means has counted the number of stacks entering said loading station that has been pre-set on said count demand dials, programming means for automatically operating said deflector extending and retracting means and said conveyor table orienting means whereby to deliver stacks to said loading stations in any desired sequence automatically in accordance with a pre-set program schedule, said loading means comprise loader operated telescoping loading conveyor means and means connecting said loading means to said control means operative to prevent delivery to any loading station until said loader has extended the loading conveyor means into his loading conveyance.

12. In an automated newspaper mail room, feeding conveyor means for carrying stacks of newspapers through wrapping and tying means to dispatch conveyor means, said dispatch conveyor means comprising a plurality of separate bidirectionally operating conveyor tables positioned end to end with respect to each other, a plurality of extendable and retractable deflector means positioned along said dispatch conveyor means at the juncture points of said conveyor tables for deflecting said stacks from said dispatch conveyor means to a like plurality of loading stations, loading means positioned at each of said loading stations to carry said stacks into delivery conveyances, and control means for orienting the flow of stacks on said dispatch conveyor means to any one of said loading stations and for extending the deflector for said loading station to route stacks onto the loading means at said loading station, said control means include stack count sensing means at each of said loading stations connected to predetermined counter means for each of said loading stations, said counter means having count demand dials which may be pre-set for any predetermined number of stacks scheduled for delivery to each loading station, means for extending the deflector at any selected loading station and for orienting the direction of operation of said conveyor tables to route flow to said extended deflector and means for retracting said extended deflector when said stack count sensing means has counted the number of stacks entering said loading station that has been pre-set on said count demand dials, programming means for automatically operating said deflector extending and retracting means and said conveyor table orienting means whereby to deliver stacks to said loading stations in any desired sequence automatically in accordance with a pre-set program schedule, jam sensing means positioned between said loading conveyor and said count sensing means, means interconnecting said jam sensing means and said control means whereby said control means automatically routes the flow of stacks to the next loading station ready and programmed to receive stacks when a jam occurs at the loading conveyor receiving stacks.

References Cited in the file of this patent
UNITED STATES PATENTS

| | | |
|---|---|---|
| 1,582,315 | Strandt | Apr. 27, 1926 |
| 1,923,753 | Scofield | Aug. 22, 1933 |
| 2,328,317 | Wentworth | Aug. 31, 1943 |
| 2,362,079 | McCann | Nov. 7, 1944 |
| 2,614,684 | Daniels | Oct. 21, 1952 |
| 2,649,187 | Eggleston | Aug. 18, 1953 |
| 2,769,530 | Powers | Nov. 6, 1956 |
| 2,924,324 | Benson | Feb. 9, 1960 |